United States Patent [19]
Burland

[11] 3,739,336
[45] June 12, 1973

[54] EMERGENCY VEHICLE WARNING LIGHT

[76] Inventor: Oliver J. Burland, 214 Rugley Road, Western Springs, Ill. 60558

[22] Filed: July 28, 1971

[21] Appl. No.: 166,673

[52] U.S. Cl. .............................. 340/50
[51] Int. Cl. ..................... B60q 1/52, F21q 1/00
[58] Field of Search ................. 340/49, 50, 84, 87, 340/89, 366 D, 373; 240/7.1 R

[56] References Cited
UNITED STATES PATENTS

| | | | |
|---|---|---|---|
| 3,408,624 | 10/1968 | Kennelly | 340/50 |
| 2,578,239 | 12/1951 | Gosswiller | 340/50 |
| 2,473,631 | 6/1949 | Beemer | 340/121 X |
| 2,345,382 | 3/1944 | Cramer | 340/50 UX |
| 2,823,366 | 2/1958 | Schmitz | 340/49 |
| 3,032,641 | 5/1962 | Deputy | 340/25 X |
| 3,309,661 | 3/1967 | Kennelly | 340/50 |
| 2,762,994 | 9/1956 | Kennelly | 340/50 |

Primary Examiner—John W. Caldwell
Assistant Examiner—Kenneth N. Leimer
Attorney—Dawson, Tilton, Fallon & Lungmus

[57] ABSTRACT

An emergency vehicle warning light having three aligned lamp units with the middle unit having a double lamp, each unit being mounted on a vertical post for oscillation in a horizontal plane, the source of electrical current to the lamps being delivered through the bottom ends of the posts.

1 Claim, 5 Drawing Figures

Patented June 12, 1973

Patented June 12, 1973  3,739,336

EMERGENCY VEHICLE WARNING LIGHT

BACKGROUND AND SUMMARY OF INVENTION

The warning light of this invention is an improvement on the light shown in the co-owned U.S. Pat. No. 3,408,624.

With the large number of vehicles being used today, it is imperative that an emergency warning light be distinctive to achieve its intended purpose. At the same time, it is important to achieve a warning light which is relatively simple in construction so as to be within the economic reach of literally thousands of municipalities — and without sacrificing ruggedness, reliability and easy maintenance.

All of these diverse objectives are achieved in the instant invention through the provision of a novel light unit incorporating both mechanical and electrical features whereby a particular unit can be readily repaired or interchanged. Each of the lamp units includes a novel electric current conducting arrangement wherein a current conducting disc is secured to the bottom end of the vertically extending oscillating post so that maintenance is readily performed within the usual supporting base.

DETAILED DESCRIPTION OF INVENTION

The invention is described in conjunction with an illustrative embodiment in the accompanying drawing, in which FIG. 1 is a front elevational view of the inventive emergency warning light device;

Figure 1:
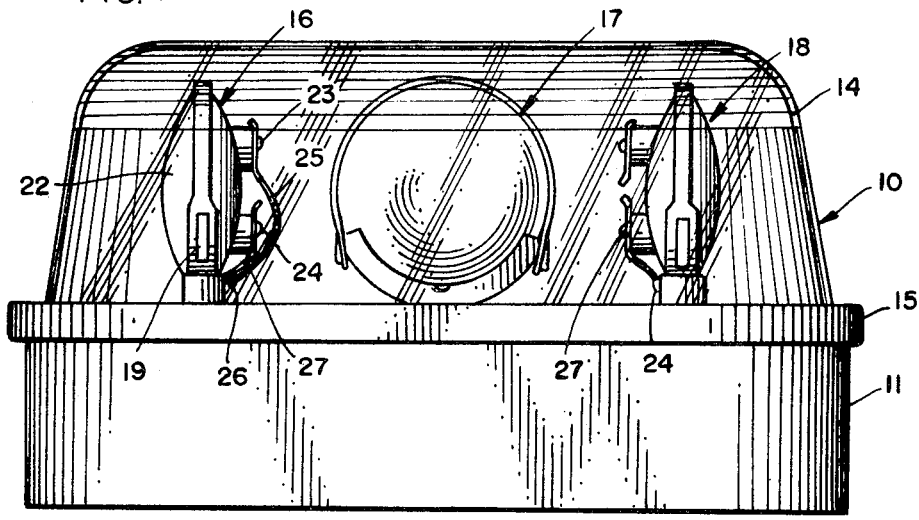

In the illustration given, the numeral 10 designates generally the inventive light and is seen to include an elongated base 11. The light is intended to be installed with the length of the base 11 extending transversely of the emergency vehicle (not shown). The base 11 is hollow with the top thereof closed by a mounting plate 12 (see particularly FIGS. 2–4). For this purpose, the base 12 is equipped with integral mounting lugs 13 (see FIG. 3) to which the mounting plate 12 is bolted.

Positioned above the base 11 is a transparent globe 14 (see FIG. 1) which is clamped in water tight fashion to the base 11 by a ring 15. Suitable gasketing (not shown) may be employed in conjunction with the ring 15.

Figure 2:
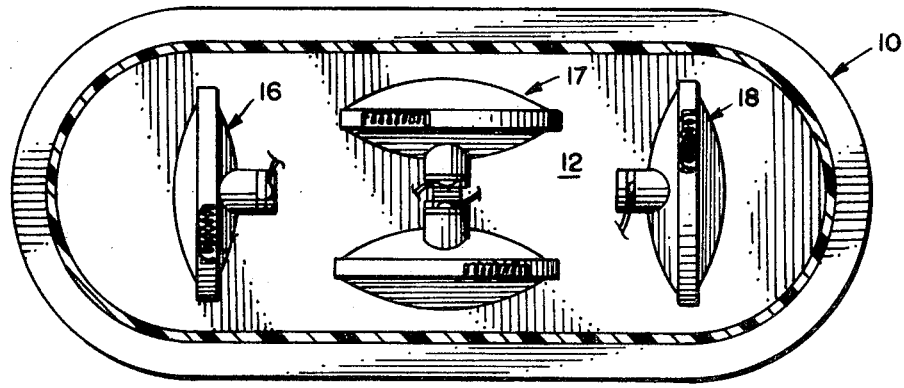
FIG. 2 is a top plan view of the device of FIG. 1 with a portion of the transparent globe cut away.

Three light units generally designated 16, 17, and 18 are carried by the mounting plate 12. As can be seen in FIG. 2, the units are aligned in the direction of the length of the housing 10 (and therefore the base 11) with the end units 16 and 18 being single lamp units while the middle unit 17 includes a pair of sealed beam lamps.

Each of the lamp units 16–18 includes a lamp cradle as at 19 (see FIG. 4) for the end units 16 and 18 and as at 20 for the middle unit 17. Each cradle 19 or 20, as the case may be, is fixed to the top of a vertically extending post 21. The details of the hollow post 21 associated with the cradle 20 of the middle unit 17 is seen in detail in FIG. 5 and will be described hereinafter. The post provides the means for conducting electrical current to the associated lamp or lamps. In FIG. 1, for example, the lamp 22 is seen to be equipped with contacts 23 and 24 on the rear side thereof. A conduit wire 25 connects the contact 23 with the cradle 19 (as at the point designated 26) so as to provide the ground return connection. The current is delivered from a suitable source of e.m.f. (not shown) through the associated hollow post 21 and a conduit wire 27 (or wires for the double lamp unit 17 — see FIG. 5) to the contact 24. Similar electrical connections are provided for the remaining lamps but are omitted for simplicity of presentation.

Figure 4:
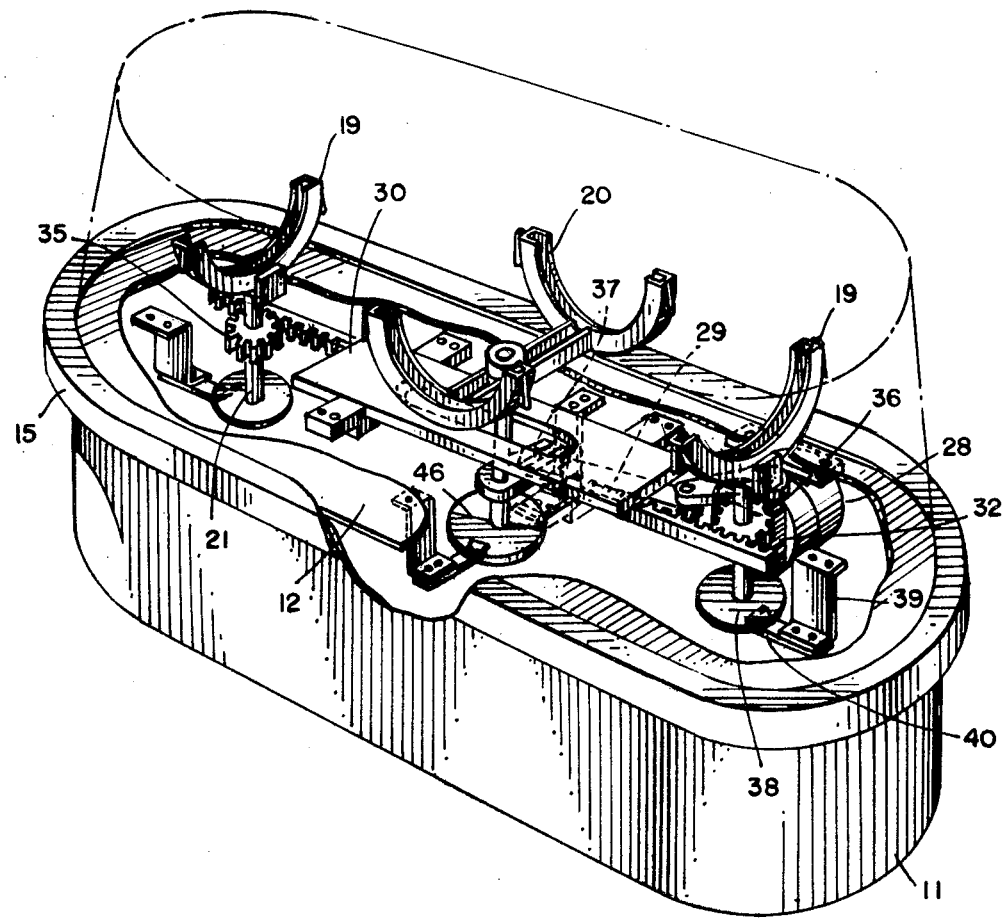
FIG. 4 is a perspective view of the device seen in FIGS. 1–3 and partially broken away to reveal the working parts within the base.
Figure 5:
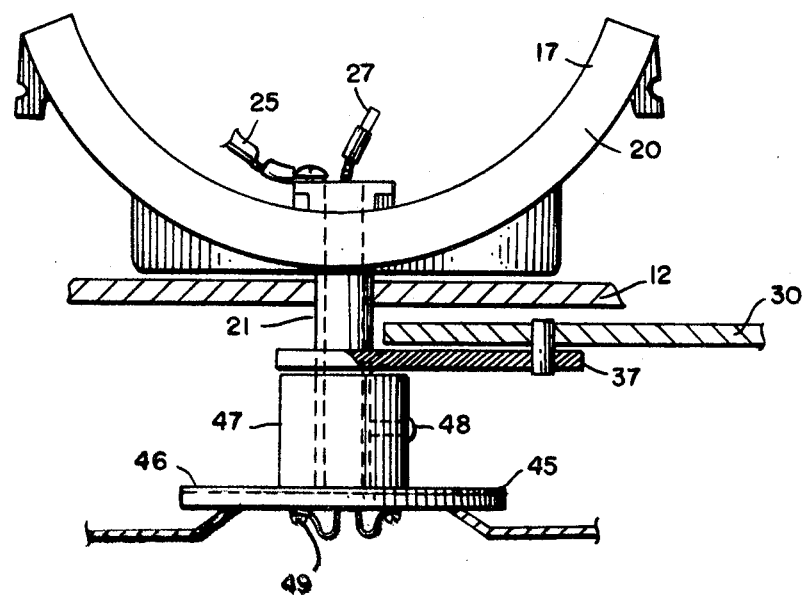
FIG. 5 is a fragmentary sectional view through the oscillating post associated with the middle (double lamp) light unit of the preceding views.

Each post 21 is suitably journaled within the mounting plate 12 in the fashion depicted in FIG. 5. Thus, the posts 21 are mounted for oscillation about vertical axes so as to cause the associated lamps to sweep in a horizontal plane. To achieve the oscillating movement, a motor 28 (see FIG. 3, for example) is mounted on the underside of the mounting plate 12 and within the hollow base 11. The means for coupling the motor with each of the posts 21 can be seen best in FIGS. 3 and 4 and includes a crank generally designated 29 which at one end is coupled to the motor 28 and at the other end to a slide plate 30. The slide plate 30 is mounted on the underside of the mounting plate 12 and is supported for longitudinal movement within the base 11 by means of nylon bearing clips 31. Thus, rotary motion from the motor 28 which may be reduced in speed through a gear reducer 32, is converted via the crank 29 to a reciprocating motion manifested in the movement of the slide plate 30.

Fixed to opposite ends of the slide plate 30 are gear racks 33 and 34, one each for the posts 21 associated with the end units 16 and 18. To complete the transmission train, the posts 21 of the end units 16 and 18 are equipped with pinion gears as at 35 and 36. It will be noted that the racks 33 and 34 are positioned on opposite sides of the slide plate 30 so that in any given movement of the slide plate 30, the rotation induced in the units 16 and 18 is opposite, i.e., the associated lamps rotate in opposite directions so that in any given cycle, the lamps of the end units turn toward each other and then away from each other rather than moving in the same direction.

Figure 3:
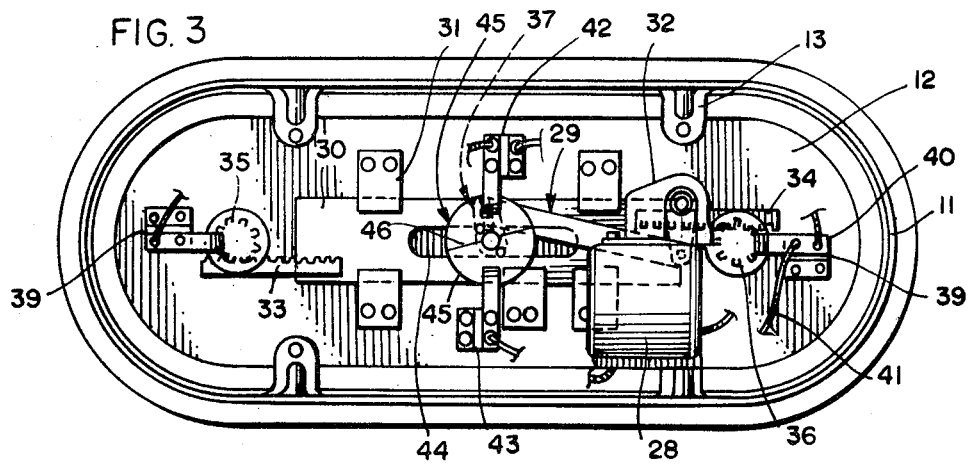
FIG. 3 is a bottom plan view of the device seen in FIGS. 1 and 2.

Oscillatory movement is developed in the posts 21 associated with the middle unit 17 by means of a fork and pin arrangement generally designated 37 (see FIGS. 3 and 4). For this purpose, the slide plate 30 is equipped with a depending pin which is received within the jaw of a fork fixed to the posts 21 (see also FIG. 5).

Electrical current for each of the units 16–18 is provided in the form of a conducting disc means as, for example, at 38 relative to the posts 21 associated with the end unit 18. The disc 38 is a copper disc fixed to the bottom end of the post 21 and is electrically connected through the post 21 (in the fashion indicated in FIG. 5) with the hot wire 27 leading to the contact 24. To deliver electrical current to the disc 38, a bracket 39 (see FIGS. 3 and 4) is provided on the underside of the mounting plate 12. The bracket 39 is seen to be equipped with a contact arm 40 which is resiliently urged against the surface of the disc 38 and thus in brush-like fashion conducts current to the disc 38, the current being delivered to the contact arm 40 by means of an electrical conduit wire 41 (see FIG. 3). A pair of brackets 42 and 43 are provided for the double lamp middle unit 17 and a single bracket identical to that designated 39 for the end unit 18 is provided for the other end unit 16 and is also designated 39. Suitable wiring interconnect the various brackets to deliver electric current, only portions of the wiring being shown so as to simplify the presentation herein.

The post 21 (see FIGS. 3–5) of the middle unit 17 extends through a slot 44 provided in the slide plate 30. The slot 44 is elongated in the direction of the length of the base 11 and this accommodates the alignment of the three lamp units while still permitting opposite rotation of the end lamp units 16 and 18. To insure that suitable current is delivered to both lamps of the middle unit 17, I provide a disc 45 grooved as at 46 for the post 21 of the middle unit 17 — and utilize therefore the two brackets 42 and 43 as electrical sources. As can be seen in FIG. 5, the post 21, has the hot lead wires 27 positioned within its hollow interior. The wires 27 are coupled to portions of the disc 45 on opposite sides of the groove 46 — see FIG. 3. Attached to the lower end of the post 21 is an insulating bushing 47 which is clamped in place by means of a set screw 48. The screws 49 which couple the wires 27 to the disc 45 also serve to connect the disc 45 to the bushing 47.

I claim:

1. An emergency vehicle warning light comprising an elongated housing adapted to be mounted atop an emergency vehicle with its length extending transversely of the vehicle, said housing including a hollow base carrying three aligned lamp units for oscillation about vertical axes and spaced equally along the housing length, each unit including a hollow vertical post journaled in said base, a motor mounted inside said base, means coupling said motor with each of said posts for oscillating the same, electric current-conducting disc means on each post at the lower end thereof, bracket means for each disc means mounted in said base and being in electrical contact with said disc means, first electrical conduit means coupling a source of e.m.f. to each bracket means and said motor and second electrical conduit means coupling each of said lamp units and said motor to ground, and third electrical conduit means extending through each hollow post and connecting a lamp with the disc means on the post associated with said lamp, the middle of said lamp units including two sealed beam lamps and the end units each including a single lamp, the disc means for said middle unit including a grooved disc having a separate portion for each lamp of said middle unit, said bracket means associated with said middle unit including a pair of brackets each arranged to contact only one of said portions, said third electrical conduit means for said middle unit including a pair of wires, one for each lamp and connected to said middle unit disc means on opposite sides of said groove, said coupling means including an elongated flat plate having its length aligned with the housing length and having a longitudinally extending slot therein, the middle unit post extending through said slot, said plate having racks extending from opposite ends thereof for engagement with pinion gears on the posts of said end units, said plate being equipped with pin means for engagement with fork means on the post of said middle unit, crank means coupling said motor and plate, said racks being positioned on opposite sides of said plate ends to oscillate said end units in opposite directions with a given plate movement.

* * * * *